Aug. 6, 1957     H. MARCUS     2,801,898
TREATMENT OF AMMONIA-CONTAMINATED AIR
Filed Aug. 18, 1955
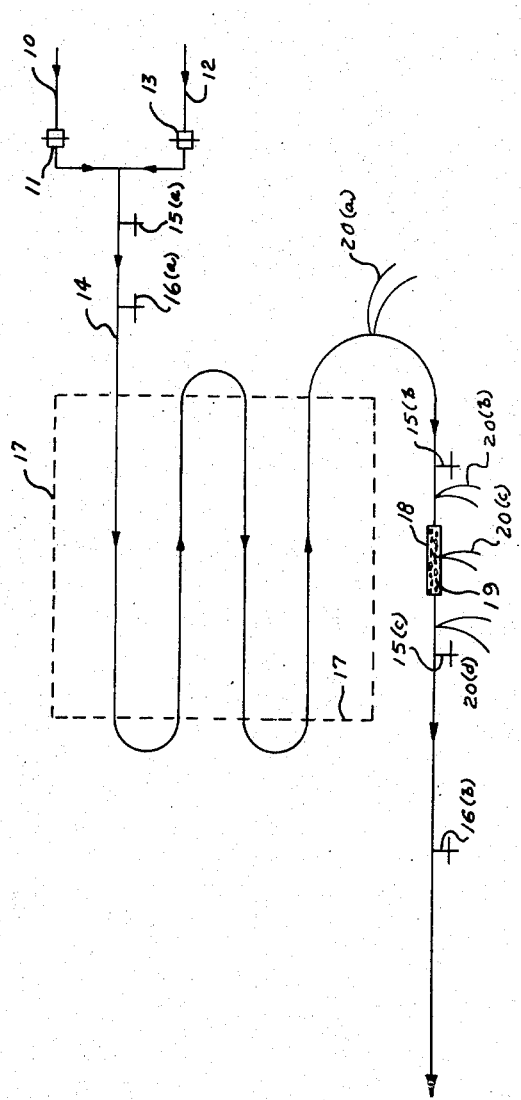
INVENTOR.
HYMAN MARCUS
BY
ATTORNEYS

2,801,898

TREATMENT OF AMMONIA-CONTAMINATED AIR

Hyman Marcus, Dayton, Ohio, assignor to the United States of America as represented by the Secretary of the Air Force Application August 18, 1955, Serial No. 529,366

7 Claims. (Cl. 23—4)

(Granted under Title 35, U. S. Code (1952), sec. 266)

The invention described herein may be manufactured and used by or for the United States Government for governmental purposes without payment to me of any royalty thereon.

This invention relates to a process for treating air-contaminated with ammonia whereby the treated air is made safe for human respiration. More particularly, this invention relates to the catalytic oxidation of ammonia-laden air wherein the concentration of the oxides of nitrogen formed from the ammonia during the oxidation reaction is minimized to a level which is not harmful for breathing purposes.

The harmful effects caused by breathing or being otherwise exposed to air containing even relatively small concentrations of ammonia over any prolonged period of time are well-known. Within confined inclosures wherein such contamination may be present from time to time, it is necessary to take special precautions as the use of gas masks, protective clothing, and similar devices. By far, a preferred approach to the problem involves the elimination of the toxic substance from the atmosphere especially under conditions wherein the air is subjected to recycling operations as in air-conditioned inclosures.

The use of liquid absorbents as sulfuric acid as well as solid absorbents including charcoal which possesses a versatile gas absorbing action applicable to the removal of ammonia from air has been previously reported. An ammonia absorption method is described in U. S. Patent No. 1,559,980 wherein the use of carrier substances such as charcoal, pumice and kieselguhr impregnated with crystalline hydrated inorganic salts of various metals including chromium, manganese, iron, cobalt, nickel, copper and zinc among others, is disclosed as a solution to the problem. This approach involves passing the ammonia-laden air through the absorbing material, the absorbing action consisting of the formation of complex metal addition or substitution products.

Although absorption techniques such as the above method may prove to be satisfactorily employed in some applications, several important limitations exist which seriously impair the effectiveness of this approach to the problem particularly under conditions wherein prolonged periods of operation are involved. For example, the rather costly ingredients must be frequently replaced or regenerated as used up or saturated with the contaminant. The fact that the ammonia is not decomposed but may be recovered from the absorbent by the use of decreased pressure or increased temperature comprises another disadvantage especially under conditions wherein the aforesaid air recycling system is involved. In such a system, the absorbed contaminant would tend to be discharged back into the circulating air upon fluctuation of the operating conditions. A still further limitation concerns the relatively large weight and volume of absorbent that would be required for efficient operation over even a limited period of time.

Extensive research has been conducted in the past on the catalytic oxidation of ammonia to develop processes of the highest efficiency in the conversion of ammonia to nitrogen oxides for the production of nitric acid. Numerous catalytic systems and processes have been disclosed for this purpose including the use of platinum and various alloys thereof, base metals, base metal oxides and various catalyst combinations including catalyst promoters.

The present invention while utilizing the catalytic oxidation of ammonia present in the air is concerned primarily with conversion of ammonia into components which are not harmful for human respiration. This requirement necessarily limits the amount of the oxides of nitrogen that can be safely tolerated. Accordingly, the process hereinafter described in detail is concerned primarily with the chemical decomposition of ammonia into components other than the oxides of nitrogen and nitrogen acid hydrides which in the presence of water form the corresponding acids which are highly undesirable for the purification of air from a corrosion viewpoint as well as the toxicity factor involved.

The catalytic decomposition of ammonia in ammonia-laden air in accordance with the process of this invention involves the utilization of a highly efficient metal oxide catalyst, namely, cupric oxide in combination with nickelous oxide as a promoter therefor, which catalyst combination under elevated temperature conditions converts the ammonia in the air passed therethrough into elemental nitrogen and water. By maintaining careful control of the oxidation temperature while passing the contaminated air through the catalyst chamber containing the promoted catalyst, it has been found that the desired reaction is substantially quantitative, the residual amount of the oxides of nitrogen or other deleterious components being sufficiently small to eliminate possibilities of hazard.

It has been further found that the effective decomposition of ammonia present in quantities as high as 5% or more in the air can be carried out over long periods of time using only relatively small amounts of catalyst and relatively low reaction temperatures. The nature and activity of the promoted catalyst herein disclosed has been found to be such that during normal operation, little or no impairment in functional properties is encountered thereby minimizing the need for frequent catalyst replacement or regeneration. At the same time, no significant corrosion problems are involved thereby making possible long, continuous and dependable operation without expensive repairs and maintenance also requiring interruptions and delays in service.

It is accordingly an object of this invention to provide a process for treating ammonia-laden air whereby the same is rendered harmless for human exposure including respiration of the treated gaseous mixture.

It is another object of this invention to provide a process for treating ammonia-contaminated air whereby the decomposition products of the contaminant comprise essentially nitrogen and water with the formation of the oxides of nitrogen being limited to below a harmful concentration.

It is a further object of this invention to provide an economical and dependable catalytic process for continuously decomposing ammonia in air wherein the treated air is rendered safe for breathing over prolonged periods of time without requiring the use of extremely high temperatures, frequent catalyst replacement or regeneration, and further making delays and interruptions of operation normally attributable to corrosion unnecessary.

Other specific objects and advantages will become apparent as the specification proceeds.

The process may be carried out, using any suitable apparatus adapted for circulating the contaminated air through a preheater zone to heat the mixture to within the desired temperature range prior to its passage through a catalyst chamber and thereafter recycling or discharging the treated air after cooling, etc., to its area of origin or elsewhere as desired. Where it becomes necessary to utilize pumping means for achieving this purpose, conventional pumps of any suitable type such as a centrifugal pump may be incorporated within the system including appropriate ducting and preheater means required to heat the mixture prior to its passage through the catalyst chamber.

The operation and effectiveness of the present process may be better understood by reference to the accompanying drawing which schematically illustrates the ammonia degradation cycle involving the use of known amounts of air and ammonia respectively in the mixture.

In the drawing, the flow system shown therein consists of air inlet 10 having a calibrated orifice 11 for regulating the amount of air introduced into the system. A known amount of ammonia is similarly introduced through inlet 12 containing calibrated orifice 13. The gaseous mixture simulating contaminated air is transmitted through a common duct 14 which is provided with pressure taps 15(a) through 15(c) respectively for attachment of pressure gages and gas taps 16(a) and 16(b) for withdrawing samples of the mixtures for analysis. Heating means 17 of any suitable type capable of preheating the air flow within the common duct to temperatures above 800° F. are provided, one such means consisting of an electric furnace (Burrell) schematically represented in the drawing.

The preheated gas is passed through catalyst chamber 18 containing catalyst composition 19 in a form suitable for preventing plugging of the unit during operation. Platinum-platinum alloy containing 10% rhodium thermocouples 20(a) through 20(d) are positioned along common duct 14 in such a manner that temperature measurements may be taken at the respective stations indicated in the figure. At exit gas tap 16(b), an indicator bottle (not shown) is stationed containing a suitable indicator for detecting the presence of ammonia in the treated gas. Phenol red which is sensitive in the pH range from 6.8 to 8.4 is a suitable indicator and it is preferred to use tap water (pH 6.6) in the indicator bottle since the pH of distilled water will change the color of the indicator to pink. Starting with a yellow-colored solution at a slightly acidic pH, introduction of a minute trace of ammonia will change the indicator color to pink whereas an appreciable amount of ammonia changes the solution to a blue-red color.

The same gas tap 16(b) may be utilized for the analysis of exit gases by removing the indicator bottle and substituting a graduate cylinder (not shown) containing a known volume of standard potassium permanganate. The percent of the oxides of nitrogen in the exit gas mixture can be readily determined by this method by accurately noting the time required for decolorization of the reagent. The components of the exit gas mixture which reduce the permanganate include $NO_2$, $N_2O_3$, $N_2O_4$, $N_2O_5$ and the nitrite ion in the presence of hydrogen ions.

The chemical reaction involved in the catalytic conversion of the present process may be represented by the equation:

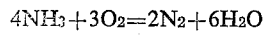
$$4NH_3 + 3O_2 = 2N_2 + 6H_2O$$

It is probable that the mechanism of the reaction consists partly or completely in the preliminary splitting of ammonia into its elements in contact with the heated catalyst, the hydrogen thus produced combining with the oxygen present, while the nitrogen remains in an elementary condition. The fundamental oxidation reaction competing with the reaction indicated above, however, consists of the transformation of ammonia to nitric oxide in accordance with the equation:

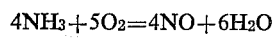
$$4NH_3 + 5O_2 = 4NO + 6H_2O$$

Other reactions are undoubtedly involved but it is apparent from the foregoing that, for the purpose of the present invention, it is imperative that the choice of catalyst and reaction conditions be such that the decomposition of all of the ammonia be involved with the formation of the oxide or oxides nitrogen in the exit gaseous mixture being kept to a minimum level.

The catalyst combination found to be particularly advantageous in minimizing the formation of the oxides of nitrogen while decomposing virtually all of the ammonia present in the air up to relatively high concentrations thereof, as previously indicated, consists essentially of cupric oxide in granular form coated with nickelous oxide as a promoter therefor. For providing the prerequisite free space for passage of the mixture without any substantial pressure drop, it is important that the catalyst preparation be of adequate particle size and also possess adequate resistance to physical disintegration over extended periods of use. Although cupric oxide may be made available in sufficiently large granular form by various processing methods, a preferred embodiment possessing the aforesaid properties may be prepared from cupric oxide wire which is commercially available in diameters ranging from about 1/32 to 1/16 inch. The wire comminuted to lengths ranging approximately from 1/8 to 1/2 inch lengths with 1/4 inch lengths being preferred provides an excellent form of the catalyst for the stated purpose.

Although cupric oxide either used alone as the catalyst or in combination with promoters such as ferric oxide proved to be rather ineffective for reducing the oxides of nitrogen to a sufficiently low level, the use of nickelous oxide in combination with cupric oxide has been found to be surprisingly effective in that the percent nitrogen oxides in the exit gas, as indicated by analysis, is consistently reduced to less than 1% compared to concentrations of about 3 to 5% or more which are otherwise obtained.

The promoted catalyst comprising the preparation referred to herein as the catalyst combination can be readily prepared by adding a sufficient amount of powdered nickelous oxide to completely coat the surfaces of the comminuted cupric oxide wire and sieving the mixture to remove the excess powder. For example, by thoroughly mixing two ounces of powdered nickelous oxide with one pound of comminuted cupric oxide and thereafter gently sieving the mixture through a 60-mesh wire screen to remove excess nickelous oxide and other very fine particles, a satisfactory catalyst combination having a cupric oxide to nickelous oxide weight ratio varying from 10 to 20:1 is obtained depending upon the surface characteristics of the cupric oxide and the particle size of the nickelous oxide. Optimum results are achieved in the process when the catalyst preparation consists of a mixture having a weight ratio of from 13 to 18:1, the major component thereof being the comminuted cupric oxide wire. Following the sieving step, the catalyst preparation is ready for packing into the catalyst chamber.

The preheating step has been found to be critical with respect to the decomposition of the total amount of ammonia present in the air. With concentrations of the contaminant present in the air in the proximity of 5% by weight or less, a minimum temperature of 800° F. and preferably between 850 and 1200° F. should be used with optimum results being obtained at about 900 to 1000° F. The temperatures referred to herein relate to the temperature of the air component considered alone, i. e., in the absence of any ammonia at a point in the flow system just prior to passage of the gas through the catalyst chamber, as illustrated by the position of thermocouple 20(b) in the drawing. It will be understood that, in the presence of ammonia, the heat of reaction attributable to the thermal decomposition of ammonia at elevated temperatures causes an appreciable temperature rise throughout the entire flow system, the increased temperature varying with the amount of ammonia involved in the reaction. This factor must be taken into consideration when determining the heat input required by the system in the presence of ammonia, the aforesaid temperature limitations being applicable only with respect to the air component of the mixture exclusively. Although higher temperatures than the above may be used, no particular advantage is derived therefrom excepting where possibly unusually high ammonia concentrations are involved. The use of temperatures below 800° F., however, results in the incomplete degradation of ammonia.

In a typical experiment demonstrating the effectiveness of the ammonia degradation process herein disclosed, the promoted catalyst was first prepared and packed into chamber 18 shown in the drawing, said chamber having a volumn slightly under 5 cubic inches. Freshly prepared indicator solution in an indicator bottle was connected to gas tap 16(b). By adjusting the flow rates of air and ammonia to provide flows of 0.359 and 0.0189 pound/min. through their respective inlets and orifices into duct 14, a 95% air 5% ammonia mixture was obtained, the composition of which was confirmed by chemical analysis of samples withdrawn at gas tap 16(a).

Prior to introduction of ammonia into the system, furnace 17 was turned on and the system was allowed to come to equilibrium as determined by reasonably constant temperature reading of the heated air at the various thermocouple stations. With a sufficient heat input to insure a minimum temperature of 800° F. and preferably closer to about 900° F. for the air at thermocouple 20(b) just before passage of the gas through catalyst chamber 18, the ammonia was turned on. A sharp rise in temperature particularly at the third thermocouple 20(c) which is extended half-way into the catalyst bed, indicated that reaction was occurring, the heat of reaction raising the equilibrium temperature at this point from 926° F. (air alone) to 1674° F. in the presence of 5% by weight of ammonia. The fact that the indicator remained on the acid side indicated that no ammonia remained in the exit gas. Analysis of the exit gases withdrawn at gas tap 16(b) indicated the presence of only 0.74% by weight of nitrogen oxides. Numerous runs involving variations in the amount of ammonia in the system and temperature conditions above the stated minimum value provided equally effective results in that the removal of ammonia is complete with the conversion of virtually all of the decomposition products to molecular nitrogen and water vapor. No appreciable physical disintegration or impairment of catalytic activity was noted over extended periods of operation.

I claim:

1. A process for treating air contaminated with ammonia to substantially eliminate toxic components therefrom comprising the steps of preheating the gaseous mixture to a temperature in excess of 800° F. independently of any heat of reaction and oxidizing the heated mixture in the presence of a promoted catalyst consisting of cupric oxide and nickelous oxide whereby the ammonia is converted substantially completely into nitrogen and water, with the amount of the oxides of nitrogen formed thereby being less than 1% by weight.

2. The process of claim 1 wherein the promoted catalyst consists of a mixture of comminuted cupric oxide wire coated with powdered nickelous oxide.

3. The process of claim 1 wherein the promoted catalyst consists of comminuted cupric oxide wire coated with powdered nickelous oxide, the ratio of cupric oxide to nickelous oxide comprising said promoted catalyst ranging from 10 to 20 parts by weight of said wire for each part of nickelous oxide.

4. A process for treating air contaminated with ammonia to substantially eliminate toxic components therefrom comprising heating the mixture to a temperature corresponding to from 850 to 1200° F. based on the air component of the mixture independently of any heat of reaction attributable to the presence of the ammonia in the system, and oxidizing the heated mixture in the presence of a catalyst combination, said combination consisting of cupric oxide particles coated with nickelous oxide powder.

5. A process for treating air contaminated with ammonia to substantially eliminate toxic components therefrom, the amount of contaminant ranging from minute quantities to concentrations of about 5% by weight comprising the steps of circulating the mixture through a heating zone adjusted to provide sufficient heat to raise the temperature of the air component of the mixture to between 900 and 1000° F. and thereafter contacting the heated mixture with a promoted catalyst containing from 13 to 18 parts by weight of comminuted cupric oxide wire per part of nickelous oxide powder coated thereon.

6. A process for treating ammonia-contaminated air to convert the mixture to an unharmful atmosphere for human exposure which comprises the steps of preheating the ammonia-contaminated air in excess of 800° F. independently of any temperature rise attributable to the heat of reaction from the thermal decomposition of the ammonia, and passing the heated mixture through a catalyst combination, said combination containing a major portion of copper oxide in granular form having dispersed thereon a minor portion of nickelous oxide powder whereby the ammonia in the mixture is oxidized to nitrogen and water with the formation of less than 1% by weight of the oxides of nitrogen.

7. The process of treating air contaminated with ammonia to substantially eliminate toxic components therefrom comprising the steps of passing the mixture through a heating zone adjusted to maintain a minimum temperature of 800° F. with respect to the air component of the mixture and thereafter oxidizing the mixture in the presence of a promoted catalyst consisting of cupric oxide granules coated with nickelous oxide powder to convert the ammonia component substantially in its entirety to molecular nitrogen and water.

References Cited in the file of this patent

UNITED STATES PATENTS

| Number | Name | Date |
|---|---|---|
| 858,904 | Ostwald | July 2, 1907 |
| 2,167,708 | Carter et al. | Aug. 1, 1939 |
| 2,601,221 | Rosenblatt et al. | June 17, 1952 |
| 2,606,875 | Rosenblatt et al. | Aug. 12, 1952 |